April 27, 1965  N. G. POMEROY  3,180,442
FLOATING DRIVE FOR BOAT SLEDS
Filed Aug. 20, 1962

INVENTOR
NEIL G. POMEROY
BY Bair, Freeman & Molinare
ATTORNEYS

United States Patent Office 3,180,442
Patented Apr. 27, 1965

3,180,442
FLOATING DRIVE FOR BOAT SLEDS
Neil G. Pomeroy, 303 Causeway Blvd., La Crosse, Wis.
Filed Aug. 20, 1962, Ser. No. 218,487
6 Claims. (Cl. 180—6)

This invention relates to a floating drive for a boat sled or the like driven by a motorized traction wheel.

One object of the invention is to provide a drive structure wherein a clamp bracket is secured to the transom of a boat sled or other ice or snow vehicle, a carriage being so mounted on the bracket that it may support a motor or engine and a traction wheel driven thereby, and in which the boat sled may be steered by a rudder bar to change the direction of the traction wheel relative thereto.

Another object is to provide the carriage vertically slidably guided on the clamp bracket so that the traction wheel can sink through a layer of snow on ice and come to rest on the surface of the ice for effective tractional coaction therewith.

Still another object is to provide the drive assembly pivoted on a horizontal axis so that the traction wheel can clear obstructions and bumps on the ice without damage thereto.

A further object is to provide a mounting arrangement in which a steering post has guide means which may take the form of a pair of laterally spaced vertical rods on which a carriage for supporting the traction wheel and motor is vertically slidable to accommodate or automatically adjust the traction wheel to the surface over which the boat sled travels.

Still a further object is to provide a traction wheel which is particularly effective in propelling the boat sled over ice, over hard packed snow or over snow-covered ice wherein the covering of snow may vary considerably without destroying the effectiveness of the tractional effectiveness of the traction wheel with respect to the surface of the ice.

With these and other objects in view, my invention consists in the construction, arrangement and combination of the various parts of my floating drive, whereby the objects above contemplated are attained, as hereinafter more fully set forth, pointed out in my claims and illustrated in detail on the accompanying drawing, wherein:

Figure 1:
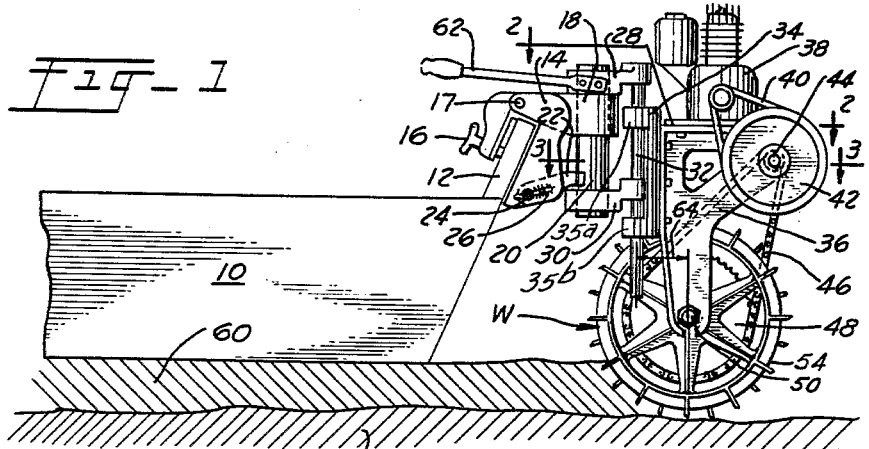
FIG. 1 is a side elevational of a boat sled with my floating drive mounted on the transom thereof.

On the accompanying drawing I have used the reference numeral 10 to indicate a boat sled or similar vehicle, the transom thereof being shown at 12. A pair of clamp brackets 14 are clamped thereto by clamp screws 16 and the clamp brackets support a pivot rod 17.

Pivoted on the rod 17 is a supporting bracket 18 in which is journalled and oscillatably mounted a steering post 20. A seat 22 is provided for the lower end of the post 20 to bear against as the drive unit propels the boat sled, and this seat is adjustable by means of a clamp bolt 24 in slots 26 of the brackets 14 so as to compensate for transoms 12 at different angles.

Figures 2, 3:
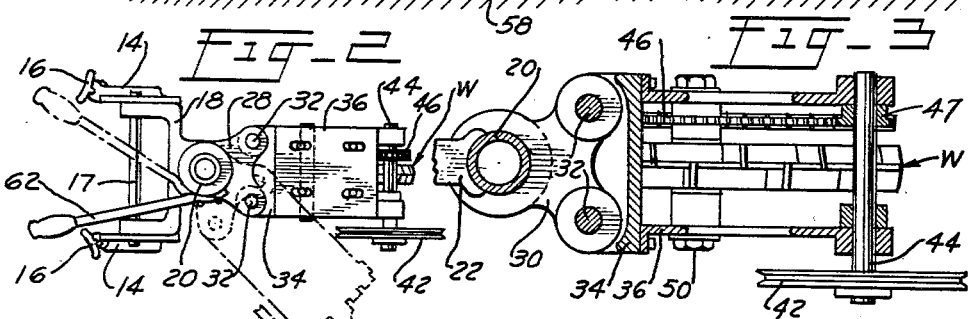
FIG. 2 is a plan view of FIG. 1 with the engine removed, being a horizontal sectional view as taken on the line 2—2 of FIG. 1.
FIG. 3 is an enlarged horizontal sectional view on the line 3—3 of FIG. 1.

A pair of brackets 28 and 30 are secured to and pivotable with the steering post 20 and support a pair of vertical guide rods 32 which are laterally spaced with respect to each other as shown in FIGS. 2 and 3. A carriage 34 has upper and lower ends 35a and 35b slidably mounted on the guide rods 32 and supports an engine and wheel bracket 36. A motor or engine 38 is mounted on the bracket 36 and a belt 40 therefrom drives a pulley 42 on a countershaft 44. A chain 46 engaged by sprocket 47 on countershaft 44, drives a sprocket 48 on a traction wheel shaft 50.

Figure 4:
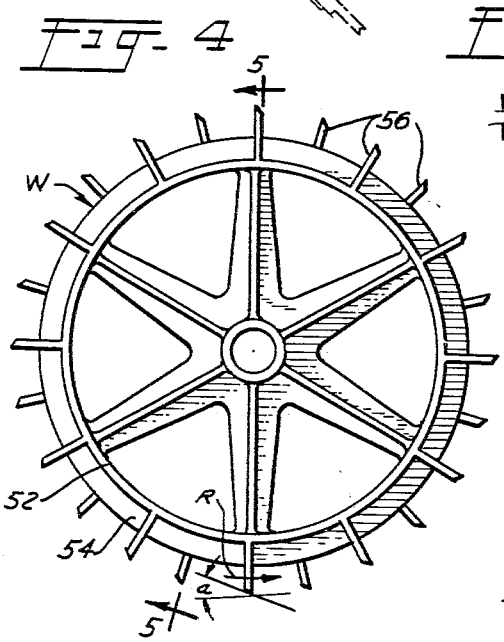
FIG. 4 is a side elevation of the traction wheel per se.
Figure 5:
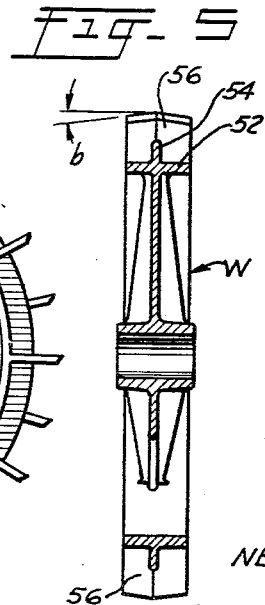
FIG. 5 is a vertical sectional view thereof on the line 5—5 of FIG. 4.
Figure 6:
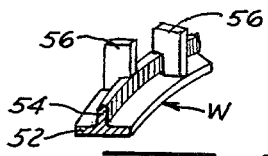
FIG. 6 is a perspective view of a portion of the rim of the wheel and two of the traction teeth thereof.

Also mounted on the shaft 50 is a traction wheel W having a rim 52, a peripheral flange 54 and traction teeth 56. The alternate teeth 56 are staggered as shown in FIGS. 4 and 6 and their outer edges are beveled as indicated by the heel angle $a$ and in a direction opposite the direction of rotation R in FIG. 4 to present sharp edges to the ice 58 shown in FIG. 1. At the same time the outer ends of the teeth are angled as indicated by angle $b$ in FIG. 5 to present acute angular points beyond the peripheral flange 54 of the rim 52 to supply traction on hard surfaces such as ice or frozen snow. If the snow such as shown at 60 is soft, the teeth readily penetrate therethrough and engage the surface of the ice. The floating connection between the carriage 34 and the guide rods 32 readily provides for automatic adjustment as shown in FIG. 1 where the teeth have penetrated through the snow and engage the surface of the ice. When there is no snow on the ice then of course the carriage 34 will ride higher on the guide rods, or if the snow 60 is frozen the carriage may assume some intermediate position depending on the hardness of the snow. The degree of penetration of the traction wheel under the weight of the bracket 36 and the engine 38 and all other mechanism mounted on the brackets 36 is thus automatically obtained.

Figure 7:
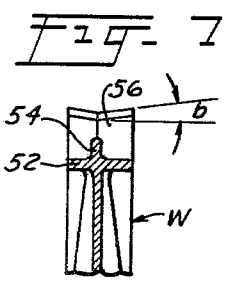
FIG. 7 is a view similar to a portion of FIG. 5 showing a modified construction.

An alternate arrangement is shown in FIG. 7 for the teeth 56 wherein the angle $b$ is applied in the opposite direction. Thereby the acute angles at the extremities of the teeth which engage the surface of the ice are aligned with the side edges of the rim 52 instead of being centrally thereof. Thus I provide a tooth design that is efficient and self-adjusting to various ice or ground conditions and the weight of the carriage and engine forces the traction wheel into engagement with the ice even though there may be a considerable accumulation of snow thereon.

The double rod arrangement 32 permits the spacing of such rods so that the traction wheel W projects into the space between rods 32 and thereby permits the traction wheel W to be located closely behind the axis of the steering post 20. The close spacing between the axis of wheel W and the axis of steering post 20 reduces the torque necessary to effect steering and therefore a relatively short steering lever 62 may be used, such lever being secured, by rivets or the like, to the bracket 28, which bracket in turn is secured to the steering post 20. The steering action is illustrated in FIG. 2 by a dotted line position. The two rods 32 swing about the axis of the steering post 20 as the post 20 is pivoted and carry the carriage 34 and the mechanisms secured thereto with it as a rigid unit; and yet the vertical sliding action on rods 32 results in a floating drive for effective traction as the surface traveled over varies during progress of the boat sled thereof.

The spacing of brackets 28 and 30 defines the range of vertical movement of upper end 35a of carriage 34, and the guide rods 32 are extended below bracket 30 sufficiently to insure engagement of end 35b with rods 32 or all positions of carriage 34.

It will be observed that the construction described provides for movement of the drive wheel W in a selected plurality of manners, such as by pivoting about rod 17, by selective pivoting about the axis of post 20, and by vertical sliding relative to rods 32, all toward the end of desirable control for a snow boat or similar vehicle.

Some changes may be made in the construction and arrangement of the parts of my floating drive without departing from the real spirit and purpose of my invention, and it is my intention to cover by my claims any modified forms of structure or use of mechanical equivalents which may reasonably be included within their scope.

I claim as my invention:

1. A floating drive for selective attachment to boat sleds or the like, said floating drive comprising clamp bracket means adapted to be selectively attached to the transom of a boat sled, a supporting bracket connected to said clamp bracket means and arranged to pivot on a horizontal axis, an upright steering guide post carried by and pivoted in said supporting bracket, upright guide means carried by said steering post and pivotable therewith about the pivot axis of said steering post, a carriage freely slidable up and down on said guide means, a traction wheel carried by said carriage, and control means connected to said steering post and arranged to pivot said upright guide means about the axis of said steering post.

2. The floating drive of claim 1 wherein said upright guide means includes a pair of laterally spaced elongated rods that extend parallel to said steering post, and said carriage providing pairs of spaced tubular elements slidably arranged on each of said spaced rods.

3. The floating drive of claim 1 wherein said upright guide means includes a pair of laterally spaced elongated rods which extend downwardly below the lowermost extent of the upright steering post, and wherein said traction wheel has its forward portion located between said elongated rods and with the axis of rotation of the traction wheel relatively close to the pivot axis of the steering post.

4. A floating drive for selective attachment to a boat sled, said floating drive comprising clamp bracket means adapted to be selectively attached to a transom of a boat sled, a supporting bracket pivotally connected to said clamp bracket means for pivoting about a horizontal axis, an upright steering post carried by and pivoted in said supporting bracket, upright guide means carried by said steering post and being pivotable therewith about the pivot axis of said steering post, a carriage freely slidable up and down on said guide means, and a traction wheel mounted on said carriage.

5. A floating drive for boat sleds and the like, said floating drive comprising, in combination, an upright steering post, means pivotally mounting said upright steering post, elongated upright guide means carried by said steering post in spaced relation thereto and being pivotable with the steering post about the pivot axis of the steering post, control means connected to said steering post for effecting steering control of the drive, carriage means freely slidable up and down on said guide means, a traction wheel mounted on said carriage, and drive means for the traction wheel mounted on the carriage and movable up and down with the traction wheel as the carriage slides on said guide means, whereby the transmission of drive to the traction wheel is unaffected by the steering of the floating drive.

6. The floating drive of claim 5 wherein said motorized traction wheel comprises a rim, a central peripheral flange projecting outwardly from said rim and a plurality of traction teeth projecting from said rim and arranged alternately on opposite sides of said peripheral flange.

References Cited by the Examiner
UNITED STATES PATENTS

| 613,576 | 11/98 | Kirby. | |
| 656,265 | 8/00 | Richmond | 115—1 |
| 767,460 | 8/04 | Wenberg | 180—6 |
| 1,451,991 | 4/23 | Lee | 301—43 |
| 1,501,937 | 7/24 | Benjamin | 301—41 |
| 2,135,907 | 11/38 | Miller | 115—41 |
| 2,706,528 | 4/55 | Kallio | 180—5 |
| 3,053,489 | 9/62 | Robinson et al. | 115—41 |

FOREIGN PATENTS 17,708  7/03  Sweden.

A. HARRY LEVY, *Primary Examiner.*

LEO FRIGALIA, *Examiner.*